United States Patent
Sang et al.

(10) Patent No.: US 11,787,739 B2
(45) Date of Patent: Oct. 17, 2023

(54) FLOUR BINDER FOR GYPSUM BOARD, AND RELATED METHODS, PRODUCT, AND SLURRIES

(71) Applicant: United States Gypsum Company, Chicago, IL (US)

(72) Inventors: Yijun Sang, Oak Park, IL (US); Mark Hemphill, Hawthorn Woods, IL (US)

(73) Assignee: United States Gypsum Company, Chicago, IL (US)

( * ) Notice: Subject to any disclaimer, the term of this patent is extended or adjusted under 35 U.S.C. 154(b) by 282 days.

(21) Appl. No.: 17/025,003

(22) Filed: Sep. 18, 2020

(65) Prior Publication Data

US 2021/0155543 A1    May 27, 2021

Related U.S. Application Data

(60) Provisional application No. 62/939,173, filed on Nov. 22, 2019.

(51) Int. Cl.
  *C04B 24/38*   (2006.01)
  *C04B 28/14*   (2006.01)
  (Continued)

(52) U.S. Cl.
  CPC ............ *C04B 24/383* (2013.01); *B32B 13/04* (2013.01); *B32B 13/08* (2013.01);
  (Continued)

(58) Field of Classification Search
  CPC . C04B 24/283; C04B 28/14; C04B 2111/0062; C04B 2201/50; B32B 13/04; B32B 13/08; B32B 37/0038; B32B 37/15; B32B 38/0004; B32B 38/164; B32B 2038/166; B32B 2315/18; C09J 103/02
  See application file for complete search history.

(56) References Cited

U.S. PATENT DOCUMENTS 2,017,022 A   10/1935   Roos
2,080,009 A    5/1937   Roos
(Continued)

FOREIGN PATENT DOCUMENTS

EP   1637302 B1   7/2011
EP   2929996 B1   4/2019
(Continued)

OTHER PUBLICATIONS

U.S. Appl. No. 61/717,588, filed Oct. 23, 2012, Never Issued: Abandoned/Expired.
(Continued)

*Primary Examiner* — George R Koch
(74) *Attorney, Agent, or Firm* — Leydig, Voit & Mayer, Ltd.

(57) ABSTRACT

Disclosed is an acid-modified flour and a method of making the acid-modified flour. The acid-modified flour is desirably prepared using a dry milling process. A starting flour is combined with a strong acid to form a mixture. The mixture is heated. A neutralizer is added to increase the pH of the mixture. If desired, the mixture can be dried and any agglomerates can be removed. The acid-modified flour can be used as a binder in a slurry for preparing one or more gypsum layers in a gypsum board.

17 Claims, 1 Drawing Sheet

(51) Int. Cl.
  *B32B 13/04* (2006.01)
  *B32B 13/08* (2006.01)
  *E04C 2/04* (2006.01)
  *B32B 37/00* (2006.01)
  *C09J 103/02* (2006.01)
  *B32B 37/15* (2006.01)
  *B32B 38/00* (2006.01)
  *C04B 111/00* (2006.01)
  *B32B 38/16* (2006.01)

(52) U.S. Cl.
  CPC .......... *B32B 37/0038* (2013.01); *B32B 37/15* (2013.01); *B32B 38/0036* (2013.01); *B32B 38/164* (2013.01); *C04B 28/14* (2013.01); *C09J 103/02* (2013.01); *E04C 2/043* (2013.01); *E04C 2/049* (2013.01); *B32B 38/0004* (2013.01); *B32B 2038/166* (2013.01); *B32B 2309/02* (2013.01); *B32B 2315/18* (2013.01); *B32B 2317/20* (2013.01); *C04B 2111/0062* (2013.01); *C04B 2201/50* (2013.01)

(56) References Cited

U.S. PATENT DOCUMENTS

| | | |
|---|---|---|
| 3,573,947 A | 4/1971 | Kinkade et al. |
| 3,943,000 A | 3/1976 | Ferrara |
| 4,518,652 A | 5/1985 | Willoughby |
| 5,643,510 A | 7/1997 | Sucech |
| 5,683,635 A | 11/1997 | Sucech et al. |
| 6,342,284 B1 | 1/2002 | Yu et al. |
| 6,409,825 B1 | 6/2002 | Yu et al. |
| 6,494,609 B1 | 12/2002 | Wittbold et al. |
| 6,632,550 B1 | 10/2003 | Yu et al. |
| 6,815,049 B2 | 11/2004 | Veeramasuneni et al. |
| 6,822,033 B2 | 11/2004 | Yu et al. |
| 6,874,930 B2 | 4/2005 | Wittbold et al. |
| 7,364,676 B2 | 4/2008 | Sucech et al. |
| 7,771,851 B2 | 8/2010 | Song et al. |
| 9,540,810 B2 | 1/2017 | Sang et al. |
| 10,399,899 B2 | 9/2019 | Sang et al. |
| 10,919,808 B2 | 2/2021 | Sang et al. |
| 2005/0223949 A1 | 10/2005 | Bailey et al. |
| 2007/0048490 A1 | 3/2007 | Yu et al. |
| 2008/0090068 A1 | 4/2008 | Yu |
| 2010/0247937 A1 | 9/2010 | Liu et al. |
| 2012/0168527 A1 | 7/2012 | Li et al. |
| 2012/0170403 A1 | 7/2012 | Li et al. |
| 2014/0113124 A1 | 4/2014 | Sang et al. |
| 2014/0113128 A1* | 4/2014 | Sang ................ C04B 24/38 156/39 |
| 2015/0010767 A1* | 1/2015 | Sang ................ C08B 30/14 127/38 |
| 2015/0175482 A1 | 6/2015 | Stav et al. |
| 2017/0008192 A1 | 1/2017 | Kawamura et al. |
| 2017/0096366 A1 | 4/2017 | Vilinska et al. |
| 2017/0096369 A1 | 4/2017 | Vilinska et al. |
| 2017/0152177 A1 | 6/2017 | Vilinska et al. |
| 2019/0023612 A1 | 1/2019 | Sang et al. |
| 2019/0023614 A1 | 1/2019 | Sang et al. |
| 2019/0322584 A1 | 10/2019 | Sang et al. |
| 2020/0262180 A1 | 8/2020 | Hemphill et al. |
| 2020/0262756 A1 | 8/2020 | Morlat et al. |

FOREIGN PATENT DOCUMENTS

| | | |
|---|---|---|
| EP | 3342571 B1 | 7/2020 |
| WO | WO 2015/050804 A1 | 4/2015 |

OTHER PUBLICATIONS

U.S. Appl. No. 13/835,002, filed Mar. 15, 2013, Patented.
U.S. Appl. No. 14/044,582, filed Oct. 2, 2013, Patented.
U.S. Appl. No. 14/494,547, filed Sep. 23, 2014, Patented.
U.S. Appl. No. 15/186,147, filed Jun. 17, 2016, Patented.
U.S. Appl. No. 15/359,196, filed Nov. 22, 2016, Patented.
U.S. Appl. No. 15/787,264, filed Oct. 18, 2017, Patented.
U.S. Appl. No. 16/053,485, filed Nov. 9, 2021, Patented.
U.S. Appl. No. 16/554,298, filed Oct. 5, 2021, Patented.
U.S. Appl. No. 62/534,041, filed Jul. 18, 2017, Never Issued: Abandoned/Expired.
U.S. Appl. No. 15/934,088, filed Mar. 23, 2018, Pending.
U.S. Appl. No. 16/027,028, filed Jul. 3, 2018, Patented.
European Patent Office, International Search Report and the Written Opinion in International Application No. PCT/US2020/061003 (dated Feb. 18, 2021).

* cited by examiner

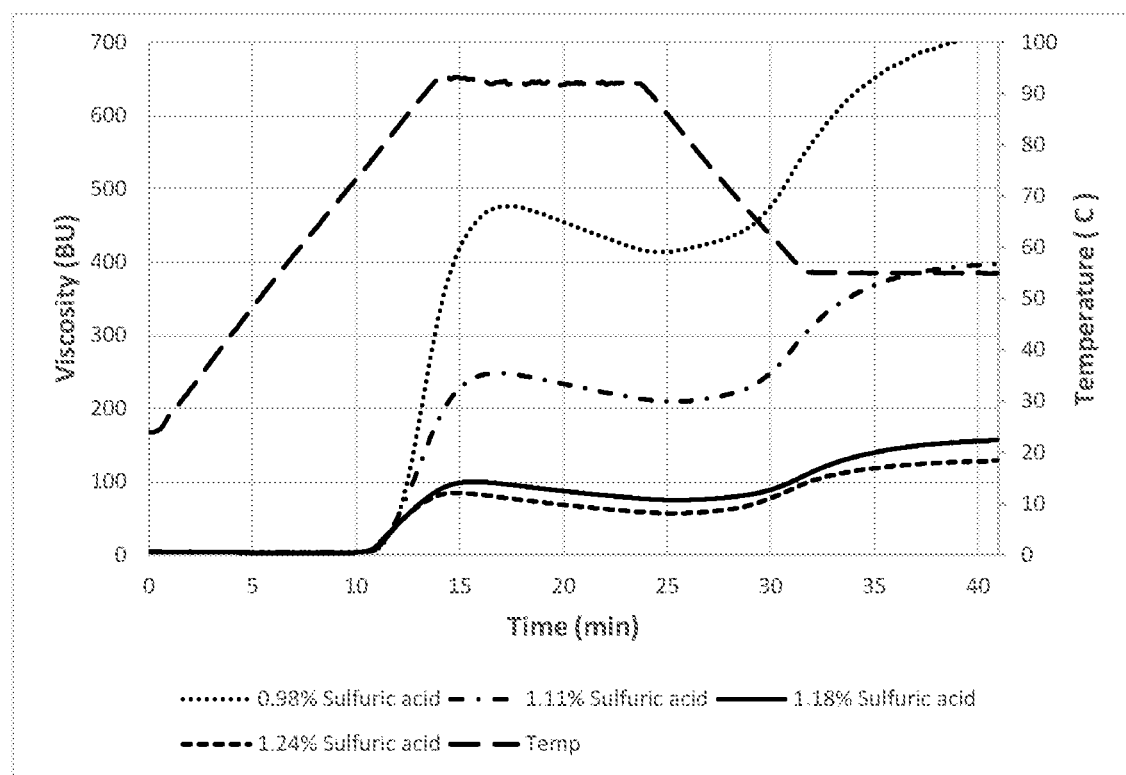

FLOUR BINDER FOR GYPSUM BOARD, AND RELATED METHODS, PRODUCT, AND SLURRIES

CROSS REFERENCE TO RELATED APPLICATION

This application claims the benefit of priority from U.S. Provisional Patent Application No. 62/939,173 filed on Nov. 22, 2019, the entire disclosure of which is incorporated herein by reference.

BACKGROUND OF THE INVENTION

Starches generally contain two types of polysaccharides (amylose and amylopectin) and are classified as carbohydrates. Some starches are pregelatinized, typically through thermal means. Generally, pregelatinized starches can form dispersions, pastes, or gels with cold water. Pregelatinized starches are generally digestible and have been used in a number of ways, including as an additive to a variety of food products (e.g., in baking, snacks, beverages, confections, dairy, gravies, prepared foods, sauces, and meats) and in pharmaceuticals.

Another use for pregelatinized starches is as a binder in the preparation of gypsum wallboard. In this regard, during manufacture of the board, stucco (i.e., calcined gypsum in the form of calcium sulfate hemihydrate), water, starch, and other ingredients as appropriate are mixed, typically in a pin mixer as the term is used in the art. Pinless mixers as known in the art may also be used. A slurry is formed and discharged from the mixer onto a moving conveyor carrying a cover sheet with one of the skim coats (if present) already applied (often upstream of the mixer). The slurry is spread over the paper (with skim coat optionally included on the paper). Another cover sheet, with or without skim coat, is applied onto the slurry to form the sandwich structure of desired thickness with the aid of e.g., a forming plate or the like.

The mixture is cast and allowed to harden to form set (i.e., rehydrated) gypsum by reaction of the calcined gypsum with water to form a matrix of crystalline hydrated gypsum (i.e., calcium sulfate dihydrate). It is the desired hydration of the calcined gypsum that enables the formation of the interlocking matrix of set gypsum crystals, thereby imparting strength to the gypsum structure in the product. Heat is used (e.g., in a kiln) to drive off the remaining free (i.e., unreacted) water to yield a dry product.

Often, the use of pregelatinized starches as a binder adds water demand to the gypsum board manufacturing process. To compensate for the water demand and allow for sufficient fluidity during manufacture, water is typically added into the stucco slurry. This excess water creates inefficiencies in the manufacture, including increased drying time, slower manufacturing line speeds, and/or higher energy costs.

The inventors have also found that techniques for preparing pregelatinized, partially hydrolyzed starches have not been fully satisfactory. Conventional methods for preparing such pregelatinized, partially hydrolyzed starches have not been efficient, and suffer from high energy costs. Some prior techniques have required copious amounts of water that then needs to be dried off. Thus, there is a need in the art for an improved method of preparing binder for wallboard manufacture, particularly exhibiting lower water demand.

It will be appreciated that this background description has been created by the inventors to aid the reader, and is not to be taken as a reference to prior art nor as an indication that any of the indicated problems were themselves appreciated in the art. While the described principles can, in some regards and embodiments, alleviate the problems inherent in other systems, it will be appreciated that the scope of the protected innovation is defined by the attached claims, and not by the ability of the claimed invention to solve any specific problem noted herein.

BRIEF SUMMARY OF THE INVENTION

The invention provides a binder that has particular utility in the preparation of gypsum board, as well as a method of preparing the binder. The binder is in the form of an acid-modified flour. The invention also provides a stucco slurry, a gypsum board, and a method of making gypsum board relating to the acid-modified flour.

Thus, in one aspect, the invention provides a method of making acid-modified flour. In certain preferred embodiments, the method comprises combining starting flour and a strong acid that substantially avoids chelating calcium ions to form a mixture. The mixture is heated. A neutralizer is added to the mixture to achieve a pH of from about 4.0 to about 7.5 to form the acid modified flour.

In another aspect, a method of making acid-modified flour comprises combining corn flour and a sulfuric acid to form a mixture. The mixture is heated at a temperature of from about 50° C. to about 100° C. A neutralizer such as sodium carbonate is added to the heated mixture to preferably achieve a pH of from about 4.0 to about 7.5 to form the acid modified flour. If desired, large agglomerates are filtered, e.g., using a mesh sieve (such as a No. 50 mesh sieve). The acid-modified flour is dried. The acid-modified flour preferably has a hot water viscosity of from about 50 BU to about 420 BU, as measured according to the HWVA (hot water viscosity assay) test as known in the art and as further described herein.

In another aspect, the invention provides a gypsum board. The board comprises a set gypsum core disposed between two cover sheets. The core is formed from a slurry comprising stucco, water and an acid-modified flour. The acid-modified flour has a hot water viscosity of from about 50 BU to about 420 BU, as measured according to the HWVA test.

In another aspect, the invention provides a method of making board. The method comprises forming an acid-modified flour. In certain preferred embodiments, the acid-modified flour is formed by combining starting flour and a strong acid that substantially avoids chelating calcium ions to form a mixture. The mixture is heated. A neutralizer is added to the heated mixture to achieve a pH of from about 4.0 to about 7.5 to form the acid modified flour. The acid-modified flour is mixed with at least water and stucco to form a stucco slurry. The stucco slurry forms a board core disposed between a first cover sheet and a second cover sheet to form a wet assembly. The wet assembly is cut into a board, and the board is dried.

In another aspect, a method of making board comprises forming an acid-modified flour. The acid-modified flour is formed by combining starting corn flour and a sulfuric acid to form a mixture. The mixture is heated at a temperature of from about 50° C. to about 100° C. Sodium carbonate is added to the heated mixture to achieve a pH of from about 4.0 to about 7.5 to form the acid modified flour. Large agglomerates having a size of at least about 300 µm are filtered. The mixture is dried to form the acid-modified flour. The acid-modified flour has a hot water viscosity of from about 50 BU to about 420 BU, as measured according to the HWVA test. The acid-modified flour is mixed with at least water and stucco to form a stucco slurry. The stucco slurry forms a board core between a first cover sheet and a second cover sheet to form a wet board assembly. The wet board assembly is cut into a board, and the board is dried.

In another aspect, the invention provides a stucco slurry comprising water, stucco, and at least one acid-modified flour. The flour can have, for example, a hot water viscosity of from about 50 BU to about 420 BU, as measured according to the HWVA test.

BRIEF DESCRIPTION OF THE SEVERAL VIEWS OF THE DRAWING(S)

FIG. 1 is graph of the Viscosity in BU (y-axis) versus Time (x-axis) as discussed in Example 1.

DETAILED DESCRIPTION OF THE INVENTION

The invention is predicated, at least in part, on providing a binder that can be used as a raw material in the preparation of gypsum board. The binder is provided to, among other things, enhance strength in the gypsum board. Gypsum board contains one or more gypsum layers, which contain set gypsum formed from a slurry containing stucco, water, and other ingredients as desired, such as foaming agent, dispersant, polyphosphate, accelerator, retarder, etc. The binder is in the form of an acid-modified flour.

Flour is normally composed of starch and protein as its two largest components. Flour can include other components such as oil, fat, and cellulosic fiber. Instead of isolating starch for use as the binder as in conventional techniques, the invention provides the acid-modified flour as the binder. In one aspect of the invention, the present inventors have discovered that, surprisingly and unexpectedly, the flour can be prepared efficiently via a dry milling process. Advantageously, the dry milling process allows for the preparation of the binder in an efficient manner since it does not require excess water as in prior methods of making starch binder. The requirement of water in making binder requires input costs, as well as energy demand and delays to drive off the water.

In one aspect, the invention provides a method of making the acid-modified flour. In preferred embodiments, the acid-modified flour has a lower water demand when used in a stucco slurry than a similar stucco slurry varying only by including a typical pregelatinized starch instead of the acid-modified flour. In such embodiments, the method comprises combining starting flour and a strong acid that substantially avoids chelating calcium ions to form a uniform or non-uniform mixture. Similarly, other ingredients (e.g., neutralizer) used in making the acid-modified flour are desirably selected to avoid chelating calcium ions. Without wishing to be bound by any particular theory, chelating the calcium ions is undesirable because it could result in forming a coordination complex with calcium or otherwise interfering with the formation of the gypsum crystals. This interference may result in reduction in the number of gypsum crystals formed, a decreased rate of formation of the gypsum crystals, decreased interactions between gypsum crystals, etc.

Desirably, the preparation of the acid-modified flour uses a flour from a dry milling process and a dry acid-modification process that is not a conventional slurry reaction that requires excess water. In preferred embodiments, the preparation of the flour involves grinding and sieving. In some embodiments, the mixture contains less than about 30% moisture. The uniform or non-uniform mixture of starting flour and acid is heated to hydrolyze starch in the flour. A neutralizer in base form is added to the mixture after heating to increase the pH to a more neutral level, e.g., from about 4.0 to about 7.5. In some embodiments, the method further comprises drying the mixture. If desired, the method further comprises removing agglomerates of the acid-modified flour, before or after drying.

Any suitable starting flour can be used in forming the mixture with strong acid. Desirable flours contain proteins that do not substantially interfere with the crystallization process as stucco is transformed into set gypsum by reaction with water. In preferred embodiments, the starting flour contains corn flour, sorghum, rice flour, potato flour, or any combination thereof. In some embodiments, the flour is corn flour or sorghum. These flours are preferred over wheat flour. In preferred embodiments, wheat flour is to be excluded inasmuch as the inventors have found that it contains protein that binds or chelates with calcium ions, thereby interfering with the formation of robust gypsum crystallization. In some preferred embodiments, the starting flour is corn flour. Protein in corn flour may have slight retardive effect on gypsum crystallization but far less than wheat flour.

The starting flour can contain any suitable amount of starch. In some embodiments, the starting flour contains at least about 70% starch by weight. In some embodiments, the starting flour contains at least about 80% starch by weight. The starting flour can contain any suitable average particle size. In some embodiments, at least about 80% of the starting flour particles pass through a 50 mesh sieve. In some embodiments, at least about 90% of the starting flour particles pass through a 50 mesh sieve, e.g., at least about 95%.

A strong acid is added to the flour, e.g., by spraying or any other desired technique. As is understood in the art, pKa value can be used to measure the strength of an acid; the lower the pKa value, the stronger the acid. In some embodiments, the strong acid has a pKa of less than 0. In some embodiments, the strong acid has a pKa of from about 0 to about −10. In some embodiments, the strong acid is sulfuric acid, nitric acid, hydrochloric acid, or any combination thereof. Sulfuric acid is preferred since it does not appreciably interfere with gypsum crystallization.

When combined, the starting flour and acid can be in any suitable amounts and weight ratios. In some embodiments, the mixture of acid and starting flour contains from about 97 wt. % to about 99.5 wt. % of the flour, and from about 0.5 wt. % to about 3 wt. % of the acid, wherein the weight percentages are in relation to the total weight of the mixture. In some embodiments, the starting flour and acid can combined in a weight ratio of from about 97:3 to about 99.5:0.5, e.g., from about 98:2 to about 99.5:0.5, such as from about 99:1 to about 99.5:0.5.

The acid hydrolysis reaction of the flour preferably is performed under heat. In preferred embodiments, the heating is sufficient to achieve a hot water viscosity of from about 50 Brabender Units (BU) to about 420 BU, as measured according to the HWVA test. Any suitable temperature and duration for the heating can be used. For example, in some embodiments, the heating is at a temperature of from about 50° C. to about 100° C. (e.g., from about 70° C. to about 90° C.). In some embodiments, the heating is from about 90 minutes to about 150 minutes (e.g., from about 105 minutes to about 135 minutes). The heating can be performed in any suitable chamber. For example, the heating can occur in a conventional oven The presence of the strong acid results in a mixture having a low pH unsuited for use in gypsum boards. A neutralizer, generally in basic form, can be added to increase the pH of the mixture. In some embodiments, the neutralizer is sodium carbonate, sodium hydroxide, or any combination thereof. In some preferred embodiments, the neutralizer is sodium carbonate.

Even though the method involves reduced moisture content as compared with wet milling processes and conventional slurry acid-modification process, the mixture can be dried if desired. The drying is less intensive than required for wet milling and slurry acid-modification of starches. For example, in some embodiments, the drying is at a temperature of at least about 25° C. (e.g., from about 25° C. to about 50° C.), for example, in an oven or other desired drying chamber for a duration of e.g., 3 hours to about 24 hours.

In some embodiments, coarse particles can form by agglomeration due to the presence of acid and heating. If desired, the coarse particles can be removed. Coarse particles are generally undesirable because of difficulty in dispersing them in the stucco slurry. In some embodiments, the method further comprises removing agglomerates from the acid-modified flour. Agglomerates of any size can be removed. For example, in some embodiments, the agglomerates have a diameter of at least about 300 μm (e.g., from about 300 μm to about 1000 μm). The agglomerates are removed before or after drying. In some embodiments, the agglomerates are removed by screening or filtration (e.g., by passing the mixture through a sieve (e.g., a No. 50 mesh sieve).

The resulting acid-modified flour can be used as a raw material for the preparation of gypsum wallboard. Preferably, the acid-modified flour requires a lower water demand in the stucco slurry as compared with a similar stucco slurry varying only by including a typical pregelatinized starch instead of the acid-modified flour. In some embodiments, the acid-modified flour has a hot water viscosity of from about 50 BU to about 420 BU, as measured according to the HWVA test. The HWVA method is set forth in, e.g., U.S. Patent Publication 2019/0023612 A1, which methodology is hereby incorporated by reference. Briefly, the test is performed using the following steps: Flour (60 g) in water (340 g) is formed into a slurry and transferred into a measuring bowl for a Brabender Amylograph. The slurry is heated from 25° C. to 92° C. and held at 92° C. for 10 min. The slurry is then cooled to 55° C. and held at 55° C. for 10 min. The hot water viscosity is determined when the 10 minute 92° C. period is completed.

The final acid-modified flour can also have any suitable average particle size. In some embodiments, at least about 60% of the acid-modified flour particles pass through a No. 50 mesh sieve, e.g., at least about 70%, or at least about 80%.

In an illustrative embodiment, the method of making acid-modified flour comprises combining corn flour and a sulfuric acid to form a mixture. The mixture is heated at a temperature of from about 50° C. to about 100° C. Sodium carbonate is added to the heated mixture to achieve a pH of from about 4.0 to about 7.5 to form the acid modified flour. Large agglomerates are filtered using a No. 50 mesh sieve. The mixture is dried to form the acid-modified flour. The acid-modified flour has a hot water viscosity of from about 50 BU to about 420 BU, as measured according to the HWVA test.

The acid-modified flour can be adopted for any suitable end-use. For example, the acid-modified flour can be used as a raw material for making gypsum boards. Thus, in other aspects, the invention provides a stucco slurry used in making a gypsum board, a gypsum board, and a method of making gypsum board. A stucco slurry comprises water, stucco, and at least one acid-modified flour. Preferably, the acid-modified flour has a hot water viscosity of from about 50 BU to about 420 BU, as measured according to the HWVA test. Other additives as desired can be included in the slurry as discussed herein.

The gypsum board comprises a set gypsum core disposed between two cover sheets. The core is formed from a slurry comprising stucco, water and an acid-modified flour. In some embodiments, the acid-modified flour has a hot water viscosity of from about 50 BU to about 420 BU, as measured according to the HWVA test. In some embodiments, the acid-modified flour enhances the strength in the gypsum layer (e.g., a board core) in the dry board as compared with a dry board having gypsum layer formed from a similar stucco slurry varying only by excluding the acid-modified flour.

For example, preferably, the board has a nail pull resistance of at least about 70 pounds-force, according to ASTM 473-10, Method B (e.g., at least about 72, at least about 75, or at least about 77). In preferred embodiments, the acid-modified flour binder of the invention enhances the strength of the gypsum board such that lower weight boards can be prepared with good strengths, e.g., having the noted nail pull resistance values. For example, the gypsum boards can have a density or about 35 pcf or less, e.g., 33 pcf or less, 31 pcf or less, 29 pcf or less, 27 pcf or less, etc., such as densities of about 15 pcf to about 35 pcf, 15 pcf to about 33 pc, 15 pcf to about 31 pcf, 15 pcf to about 30 pcf 15 pcf to about 27 pcf 20 pcf to about 35 pcf 20 pcf to about 33 pcf 20 pcf to about 31 pcf 20 pcf to about 29 pcf 25 pcf to about 35 pcf 25 pcf to about 30 pcf etc.

The method of making gypsum board comprises forming an acid-modified flour as discussed herein. The acid-modified flour is mixed with at least water and stucco to form a slurry. The slurry is disposed to form a board core between a first cover sheet and a second cover sheet to form a wet assembly. The wet assembly is cut into a board, and the board is dried.

The face and back cover sheets can have any suitable basis weight and thickness. Generally, the thickness of the face and back cover sheet (e.g., composed of paper) is determined by the (e.g., paper) weight. For example, in some embodiments, the face and back cover sheets can have a basis weight of from about 10 lb/msf to about 55 lb/msf e.g., from about 20 lb/msf to about 55 lb/msf, from about 20 lb/msf to about 50 lb/msf, from about 20 lb/msf to about 40 lb/msf from about 30 lb/msf to about 55 lb/msf from about 30 lb/msf to about 50 lb/msf from about 30 lb/msf to about 40 lb/msf, etc. In some embodiments, one or both of the face and back cover sheets have a weight of from about 15 lb/MSF to about 35 lb/msf, such as from about 20 lb/MSF to about 33 lb/msf from about 20 lb/MSF to about 31 lb/msf from about 20 lb/MSF to about 29 lb/msf from about 20 lb/MSF to about 27 lb/msf, from about 15 lb/MSF to about 31 lb/msf etc. Paper at such weights can have a nominal thickness of about 0.005 inch to about 0.015 inch thick, e.g., 0.007 to about 0.03 inch (e.g., about 0.01 inch). In some embodiments, one or more of the cover sheets can be in the form of paper having a thickness of from about 0.008 inch to about 0.013 inch. Optionally, in some embodiments, the board can include an intermediate sheet as described in U.S. patent application Ser. No. 16/581,070.

The stucco slurry used in making the gypsum layer(s) of the board contains stucco, e.g., calcined gypsum in the form of calcium sulfate alpha hemihydrate, calcium sulfate beta hemihydrate, and/or calcium sulfate anhydrite. In addition to the stucco and water, the board core is preferably formed from an agent that contributes to its lower density, preferably foaming agents, although in some embodiments low density filler (e.g., perlite, low density aggregate or the like) can be employed. Various foaming agent regimes are well known in the art. Foaming agent can be included to form an air void distribution within a crystalline matrix of set gypsum. In some embodiments, the foaming agent comprises a major weight portion of unstable component, and a minor weight portion of stable component (e.g., where unstable and blend of stable/unstable are combined). The weight ratio of unstable component to stable component is effective to form an air void distribution within the set gypsum core. See, e.g., U.S. Pat. Nos. 5,643,510; 6,342,284; and 6,632,550. In some embodiments, the foaming agent comprises an alkyl sulfate surfactant.

Many commercially known foaming agents are available and can be used in accordance with embodiments of the disclosure, such as the HYONIC line (e.g., 25AS) of soap products from GEO Specialty Chemicals, Ambler, Pa. Other commercially available soaps include the Polystep B25, from Stepan Company, Northfield, Ill. The foaming agents described herein can be used alone or in combination with other foaming agents. The foam can be pregenerated and then added to the stucco slurry. The pregeneration can occur by inserting air into the aqueous foaming agent. Methods and apparatus for generating foam are well known. See, e.g., U.S. Pat. Nos. 4,518,652; 2,080,009; and 2,017,022.

In some embodiments, the foaming agent comprises, consists of, or consists essentially of at least one alkyl sulfate, at least one alkyl ether sulfate, or any combination thereof but is essentially free of an olefin (e.g., olefin sulfate) and/or alkyne. Essentially free of olefin or alkyne means that the foaming agent contains either (i) 0 wt. % based on the weight of stucco, or no olefin and/or alkyne, or (ii) an ineffective or (iii) an immaterial amount of olefin and/or alkyne. An example of an ineffective amount is an amount below the threshold amount to achieve the intended purpose of using olefin and/or alkyne foaming agent, as one of ordinary skill in the art will appreciate. An immaterial amount may be, e.g., below about 0.001 wt. %, such as below about 0.0005 wt. %, below about 0.001 wt. %, below about 0.00001 wt. %, etc., based on the weight of stucco, as one of ordinary skill in the art will appreciate.

Some types of unstable soaps, in accordance with embodiments of the disclosure, are alkyl sulfate surfactants with varying chain length and varying cations. Suitable chain lengths, can be, for example, $C_8$-$C_{12}$, e.g., $C_8$-$C_{10}$, or $C_{10}$-$C_{12}$. Suitable cations include, for example, sodium, ammonium, magnesium, or potassium. Examples of unstable soaps include, for example, sodium dodecyl sulfate, magnesium dodecyl sulfate, sodium decyl sulfate, ammonium dodecyl sulfate, potassium dodecyl sulfate, potassium decyl sulfate, sodium octyl sulfate, magnesium decyl sulfate, ammonium decyl sulfate, blends thereof and any combination thereof.

Some types of stable soaps, in accordance with embodiments of the disclosure, are alkoxylated (e.g., ethoxylated) alkyl sulfate surfactants with varying (generally longer) chain length and varying cations. Suitable chain lengths can be, for example, $C_{10}$-$C_{14}$, e.g., $C_{12}$-$C_{14}$, or $C_{10}$-$C_{12}$. Suitable cations include, for example, sodium, ammonium, magnesium, or potassium. Examples of stable soaps include, for example, sodium laureth sulfate, potassium laureth sulfate, magnesium laureth sulfate, ammonium laureth sulfate, blends thereof and any combination thereof. In some embodiments, any combination of stable and unstable soaps from these lists can be used.

Examples of combinations of foaming agents and their addition in preparation of foamed gypsum products are disclosed in U.S. Pat. No. 5,643,510, herein incorporated by reference. For example, a first foaming agent which forms a stable foam and a second foaming agent which forms an unstable foam can be combined. In some embodiments, the first foaming agent is a soap, e.g., with an alkoxylated alkyl sulfate soap with an alkyl chain length of 8-12 carbon atoms and an alkoxy (e.g., ethoxy) group chain length of 1-4 units. The second foaming agent is optionally an unalkoxylated (e.g., unethoxylated) alkyl sulfate soap with an alkyl chain length of 6-20 carbon atoms, e.g., 6-18 or 6-16 carbon atoms. Regulating the respective amounts of these two soaps, in accordance with some embodiments, is believed to allow for control of the board foam structure until about 100% stable soap or about 100% unstable soap is reached.

In some embodiments, a fatty alcohol optionally can be included with the foaming agent, e.g., in a pre-mix to prepare the foam, as described in U.S. Patent Publications US 2017/0096369 A1, US 2017/0096366 A1, and US 2017/0152177 A1. This can result in an improvement in the stability of the foam, thereby allowing better control of foam (air) void size and distribution. The fatty alcohol can be any suitable aliphatic fatty alcohol. It will be understood that, as defined herein throughout, "aliphatic" refers to alkyl, alkenyl, or alkynyl, and can be substituted or unsubstituted, branched or unbranched, and saturated or unsaturated, and in relation to some embodiments, is denoted by the carbon chains set forth herein, e.g., $C_x$-$C_y$, where x and y are integers. The term aliphatic thus also refers to chains with heteroatom substitution that preserves the hydrophobicity of the group. The fatty alcohol can be a single compound, or can be a combination of two or more compounds. In some embodiments, the optional fatty alcohol is a $C_6$-$C_{20}$ fatty alcohol (e.g., $C_6$-$C_{18}$, $C_6$-$C_{116}$, $C_6$-$C_{14}$, $C_6$-$C_{12}$, $C_6$-$C_{10}$, $C_6$-$C_8$, $C_8$-$C_{16}$, $C_8$-$C_{14}$, $C_8$-$C_{12}$, $C_8$-$C_{10}$, $C_{10}$-$C_{16}$, $C_{10}$-$C_{14}$, $C_{10}$-$C_{12}$, $C_{12}$-$C_{16}$, $C_{12}$-$C_{14}$, or $C_{14}$-$C_{16}$ aliphatic fatty alcohol, etc.). Examples include octanol, nonanol, decanol, undecanol, dodecanol, or any combination thereof.

In some embodiments, the optional foam stabilizing agent comprises the fatty alcohol and is essentially free of fatty acid alkyloamides or carboxylic acid taurides. In some embodiments, the optional foam stabilizing agent is essentially free of a glycol, although glycols can be included in some embodiments, e.g., to allow for higher surfactant content. Essentially free of any of the aforementioned ingredients means that the foam stabilizer contains either (i) 0 wt. % based on the weight of any of these ingredients, or (ii) an ineffective or (iii) an immaterial amount of any of these ingredients. An example of an ineffective amount is an amount below the threshold amount to achieve the intended purpose of using any of these ingredients, as one of ordinary skill in the art will appreciate. An immaterial amount may be, e.g., below about 0.0001 wt. %, such as below about 0.00005 wt. %, below about 0.00001 wt. %, below about 0.000001 wt. %, etc., based on the weight of stucco, as one of ordinary skill in the art will appreciate.

It has been found that suitable void distribution and wall thickness (independently) can be effective to enhance strength, especially in lower density board (e.g., below about 35 pcf). See, e.g., US Patent Publication 2007/0048490 and US Patent Publication 2008/0090068. Evaporative water voids, generally having voids of about 5 μm or less in diameter, also contribute to the total void distribution along with the aforementioned air (foam) voids. In some embodiments, the volume ratio of voids with a pore size greater than about 5 microns to the voids with a pore size of about 5 microns or less, is from about 0.5:1 to about 9:1, such as, for example, from about 0.7:1 to about 9:1, from about 0.8:1 to about 9:1, from about 1.4:1 to about 9:1, from about 1.8:1 to about 9:1, from about 2.3:1 to about 9:1, from about 0.7:1 to about 6:1, from about 1.4:1 to about 6:1, from about 1.8:1 to about 6:1, from about 0.7:1 to about 4:1, from about 1.4:1 to about 4:1, from about 1.8:1 to about 4:1, from about 0.5:1 to about 2.3:1, from about 0.7:1 to about 2.3:1, from about 0.8:1 to about 2.3:1, from about 1.4:1 to about 2.3:1, from about 1.8:1 to about 2.3:1, etc.

As used herein, a void size is calculated from the largest diameter of an individual void in the core. The largest diameter is the same as the Feret diameter, as known in the art. The largest diameter of each defined void can be obtained from an image of a sample. Images can be taken using any suitable technique, such as scanning electron microscopy (SEM), which provides two-dimensional images. A large number of pore sizes of voids can be measured in an SEM image, such that the randomness of the cross sections (pores) of the voids can provide the average diameter. Taking measurements of voids in multiple images randomly situated throughout the core of a sample can improve this calculation. Additionally, building a three-dimensional stereological model of the core based on several two-dimensional SEM images can also improve the calculation of the void sizes. Another technique is X-ray CT-scanning analysis (XMT), which provides a three-dimensional image. Another technique is optical microscopy, where light contrasting can be used to assist in determining, e.g., the depth of voids. The voids can be measured either manually or by using image analysis software, e.g., ImageJ, developed by NIH. One of ordinary skill in the art will appreciate that manual determination of void sizes and distribution from the images can be determined by visual observation of dimensions of each void. The sample can be obtained by sectioning a gypsum board.

The foaming agent can be included in the stucco slurry in any suitable amount, e.g., depending on the desired density. A solution of foaming agent is prepared at, for example, about 0.5% (w/w). Proper amount of air is mixed with the proper amount of the solution of foaming agent, and added into slurry. Depending on the amount of air required, the concentration of the solution of the foaming agent can vary from about 0.1% to about 1% (w/w). Since the skim coat layers have a higher density, the slurry for forming the skim coat layers can be made with less (or no) foam.

The fatty alcohol can be present, if included, in the stucco slurry in any suitable amount. In some embodiments, the fatty alcohol is present in the core slurry in an amount of from about 0.0001% to about 0.03% by weight of the stucco, e.g., from about 0.0001% to about 0.025% by weight of the stucco, from about 0.0001% to about 0.02% by weight of the stucco, or from about 0.0001% to about 0.01% by weight of the stucco. Since the slurries for the skim coat layers can have les or no foam, the fatty alcohol is not required in the skim coat layers, or else can be included in a lower amount, such as from about 0.0001% to about 0.004% by weight of the stucco, e.g., from about 0.00001% to about 0.003% by weight of the stucco, from about 0.00001% to about 0.0015% by weight of the stucco, or from about 0.00001% to about 0.001% by weight of the stucco.

Other ingredients as known in the art can also be included in the board core slurry, including, for example, accelerators, retarders, etc. Accelerator can be in various forms (e.g., wet gypsum accelerator, heat resistant accelerator, and climate stabilized accelerator). See, e.g., U.S. Pat. Nos. 3,573,947 and 6,409,825. In some embodiments where accelerator and/or retarder are included, the accelerator and/or retarder each can be in the stucco slurry in an amount on a solid basis of such as, from about 0% to about 10% by weight of the stucco (e.g., about 0.1% to about 10%), such as, for example, from about 0% to about 5% by weight of the stucco (e.g., about 0.1% to about 5%).

In addition, the gypsum layer(s) can be further formed from at least one dispersant to enhance fluidity in some embodiments. The dispersants may be included in a dry form with other dry ingredients and/or in a liquid form with other liquid ingredients in stucco slurry. Examples of dispersants include naphthalenesulfonates, such as polynaphthalenesulfonic acid and its salts (polynaphthalenesulfonates) and derivatives, which are condensation products of naphthalenesulfonic acids and formaldehyde; as well as polycarboxylate dispersants, such as polycarboxylic ethers, for example, PCE211, PCE11, 1641, 1641F, or PCE 2641-Type Dispersants, e.g., MELFLUX 2641F, MELFLUX 2651F, MELFLUX 1641F, MELFLUX 2500L dispersants (BASF), and COATEX Ethacryl M, available from Coatex, Inc.; and/or lignosulfonates or sulfonated lignin. Lignosulfonates are water-soluble anionic polyelectrolyte polymers, byproducts from the production of wood pulp using sulfite pulping. One example of a lignin useful in the practice of principles of embodiments of the present disclosure is Marasperse C-21 available from Reed Lignin Inc.

Lower molecular weight dispersants are generally preferred. For naphthalenesulfonate dispersants, in some embodiments, they are selected to have molecular weights from about 3,000 to about 10,000 (e.g., about 8,000 to about 10,000). In some embodiments, higher water demand naphthalenesulfonates can be used, e.g., having molecular weights above 10,000. As another illustration, for PCE211 type dispersants, in some embodiments, the molecular weight can be from about 20,000 to about 60,000, which exhibit less retardation than dispersants having molecular weight above 60,000.

One example of a naphthalenesulfonate is DILOFLO, available from GEO Specialty Chemicals. DILOFLO is a 45% naphthalenesulfonate solution in water, although other aqueous solutions, for example, in the range of about 35% to about 55% by weight solids content, are also readily available. Naphthalenesulfonates can be used in dry solid or powder form, such as LOMAR D, available from GEO Specialty Chemicals, for example. Another example of naphthalenesulfonate is DAXAD, available from GEO Specialty Chemicals, Ambler, Pa.

If included, the dispersant can be provided in any suitable amount. In some embodiments, for example, the dispersant can be present in the stucco slurry in an amount, for example, from about 0% to about 0.5%, e.g., from about 0.01% to about 0.7%, e.g., from about 0.01% to about 0.4% by weight of the stucco, from about 0.1% to about 0.2%, etc.

In some embodiments, the gypsum layer(s) can be further formed from at least one phosphate-containing compound, if desired, to enhance green strength, dimensional stability, and/or sag resistance. For example, phosphate-containing components useful in some embodiments include water-soluble components and can be in the form of an ion, a salt, or an acid, namely, condensed phosphoric acids, each of which comprises two or more phosphoric acid units; salts or ions of condensed phosphates, each of which comprises two or more phosphate units; and monobasic salts or monovalent ions of orthophosphates as well as water-soluble acyclic polyphosphate salt. See, e.g., U.S. Pat. Nos. 6,342,284; 6,632,550; 6,815,049; and 6,822,033.

Phosphate compositions if added in some embodiments can enhance green strength, resistance to permanent deformation (e.g., sag), dimensional stability, etc. Green strength refers to the strength of the board while still wet during manufacture. Due to the rigors of the manufacturing process, without sufficient green strength, a board precursor can become damaged on a manufacturing line.

Trimetaphosphate compounds can be used, including, for example, sodium trimetaphosphate, potassium trimetaphosphate, lithium trimetaphosphate, and ammonium trimetaphosphate. Sodium trimetaphosphate (STMP) is preferred, although other phosphates may be suitable, including for example sodium tetrametaphosphate, sodium hexametaphosphate having from about 6 to about 27 repeating phosphate units and having the molecular formula $Na_{n+2}P_nO_{3n+1}$ wherein n=6-27, tetrapotassium pyrophosphate having the molecular formula $K_4P_2O_7$, trisodium dipotassium tripolyphosphate having the molecular formula $Na_3K_2P_3O_{10}$, sodium tripolyphosphate having the molecular formula $Na_5P_3O_{10}$, tetrasodium pyrophosphate having the molecular formula $Na_4P_2O_7$, aluminum trimetaphosphate having the molecular formula $Al(PO_3)_3$, sodium acid pyrophosphate having the molecular formula $Na_2H_2P_2O_7$, ammonium polyphosphate having 1,000-3,000 repeating phosphate units and having the molecular formula $(NH_4)_{n+2}P_nO_{3n+1}$ wherein n=1,000-3,000, or polyphosphoric acid having two or more repeating phosphoric acid units and having the molecular formula $H_{n+2}P_nO_{3n+1}$ wherein n is two or more.

If included, the polyphosphate can be present in any suitable amount. To illustrate, in some embodiments, the polyphosphate can be present in the slurry in an amount, for example, from about 0.1% to about 1%, e.g., about 0.2% to about 0.4% by weight of the stucco, from about 0% to about 0.5%, e.g., from about 0% to about 0.2% by weight of the stucco. Thus, the dispersant and polyphosphate optionally can be in any suitable amount in the stucco slurry.

In some embodiments, the composite gypsum board can have an average core hardness of at least about 11 $lb_f$, e.g., at least about 12 $lb_f$, at least about 13 $lb_f$, at least about 14 $lb_f$, at least about 15 $lb_f$, at least about 16 $lb_f$, at least about 17 $lb_f$, at least about 18 $lb_f$, at least about 19 $lb_f$, at least about 20 $lb_f$, at least about 21 $lb_f$, or at least about 22 $lb_f$, as determined according to ASTM C473-07, method B. In some embodiments, board can have a core hardness of from about 11 $lb_f$ to about 25 $lb_f$, e.g., from about 11 $lb_f$ to about 22 $lb_f$, from about 11 $lb_f$ to about 21 $lb_f$, from about 11 $lb_f$ to about 20 $lb_f$, from about 11 $lb_f$ to about 19 $lb_f$, from about 11 $lb_f$ to about 18 $lb_f$, from about 11 $lb_f$ to about 17 $lb_f$, from about 11 $lb_f$ to about 16 $lb_f$, from about 11 $lb_f$ to about 15 $lb_f$, from about 11 $lb_f$ to about 14 $lb_f$, from about 11 $lb_f$ to about 13 $lb_f$, from about 11 $lb_f$ to about 12 $lb_f$, from about 12 $lb_f$ to about 25 $lb_f$, from about 12 $lb_f$ to about 22 $lb_f$, from about 12 $lb_f$ to about 21 $lb_f$, from about 12 $lb_f$ to about 20 $lb_f$, from about 12 $lb_f$ to about 19 $lb_f$, from about 12 $lb_f$ to about 18 $lb_f$, from about 12 $lb_f$ to about 17 $lb_f$, from about 12 $lb_f$ to about 16 $lb_f$, from about 12 $lb_f$ to about 15 $lb_f$, from about 12 $lb_f$ to about 14 $lb_f$, from about 12 $lb_f$ to about 13 $lb_f$, from about 13 $lb_f$ to about 25 $lb_f$, from about 13 $lb_f$ to about 22 $lb_f$, from about 13 $lb_f$ to about 21 $lb_f$, from about 13 $lb_f$ to about 20 $lb_f$, from about 13 $lb_f$ to about 19 $lb_f$, from about 13 $lb_f$ to about 18 $lb_f$, from about 13 $lb_f$ to about 17 $lb_f$, from about 13 $lb_f$ to about 16 $lb_f$, from about 13 $lb_f$ to about 15 $lb_f$, from about 13 $lb_f$ to about 14 $lb_f$, from about 14 $lb_f$ to about 25 $lb_f$, from about 14 $lb_f$ to about 22 $lb_f$, from about 14 $lb_f$ to about 21 $lb_f$, from about 14 $lb_f$ to about 20 $lb_f$, from about 14 $lb_f$ to about 19 $lb_f$, from about 14 $lb_f$ to about 18 $lb_f$, from about 14 $lb_f$ to about 17 $lb_f$, from about 14 $lb_f$ to about 16 $lb_f$, from about 14 $lb_f$ to about 15 $lb_f$, from about 15 $lb_f$ to about 25 $lb_f$, from about 15 $lb_f$ to about 22 $lb_f$, from about 15 $lb_f$ to about 21 $lb_f$, from about 15 $lb_f$ to about 20 $lb_f$, from about 15 $lb_f$ to about 19 $lb_f$, from about 15 $lb_f$ to about 18 $lb_f$, from about 15 $lb_f$ to about 17 $lb_f$, from about 15 $lb_f$ to about 16 $lb_f$, from about 16 $lb_f$ to about 25 $lb_f$, from about 16 $lb_f$ to about 22 $lb_f$, from about 16 $lb_f$ to about 21 $lb_f$, from about 16 $lb_f$ to about 20 $lb_f$, from about 16 $lb_f$ to about 19 $lb_f$, from about 16 $lb_f$ to about 18 $lb_f$, from about 16 $lb_f$ to about 17 $lb_f$, from about 17 $lb_f$ to about 25 $lb_f$, from about 17 $lb_f$ to about 22 $lb_f$, from about 17 $lb_f$ to about 21 $lb_f$, from about 17 $lb_f$ to about 20 $lb_f$, from about 17 $lb_f$ to about 19 $lb_f$, from about 17 $lb_f$ to about 18 $lb_f$, from about 18 $lb_f$ to about 25 $lb_f$, from about 18 $lb_f$ to about 22 $lb_f$, from about 18 $lb_f$ to about 21 $lb_f$, from about 18 $lb_f$ to about 20 $lb_f$, from about 18 $lb_f$ to about 19 $lb_f$, from about 19 $lb_f$ to about 25 $lb_f$, from about 19 $lb_f$ to about 22 $lb_f$, from about 19 $lb_f$ to about 21 $lb_f$, from about 19 $lb_f$ to about 20 $lb_f$, from about 21 $lb_f$ to about 25 $lb_f$, from about 21 $lb_f$ to about 22 $lb_f$, or from about 22 $lb_f$ to about 25 $lb_f$.

With respect to flexural strength, in some embodiments, when cast in a board of ½ inch thickness, the dry board has a flexural strength of at least about 36 $lb_f$ in a machine direction (e.g., at least about 38 $lb_f$, at least about 40 $lb_f$, etc.) and/or at least about 107 $lb_f$ (e.g., at least about 110 $lb_f$, at least about 112 $lb_f$, etc.) in a cross-machine direction as determined according to the ASTM standard C473-07. In various embodiments, the board can have a flexural strength in a machine direction of from about 36 $lb_f$ to about 60 $lb_f$, e.g., from about 36 $lb_f$ to about 55 $lb_f$, from about 36 $lb_f$ to about 50 $lb_f$, from about 36 $lb_f$ to about 45 $lb_f$, from about 36 $lb_f$ to about 40 $lb_f$, from about 36 $lb_f$ to about 38 $lb_f$, from about 38 $lb_f$ to about 60 $lb_f$, from about 38 $lb_f$ to about 55 $lb_f$, from about 38 $lb_f$ to about 50 $lb_f$, from about 38 $lb_f$ to about 45 $lb_f$, from about 38 $lb_f$ to about 40 $lb_f$, from about 40 $lb_f$ to about 60 $lb_f$, from about 40 $lb_f$ to about 55 $lb_f$, from about 40 $lb_f$ to about 50 $lb_f$, or from about 40 $lb_f$ to about 45 $lb_f$. In various embodiments, the board can have a flexural strength in a cross-machine direction of from about 107 $lb_f$ to about 130 $lb_f$, e.g., from about 107 $lb_f$ to about 125 $lb_f$, from about 107 $lb_f$ to about 120 $lb_f$, from about 107 $lb_f$ to about 115 $lb_f$, from about 107 $lb_f$ to about 112 $lb_f$, from about 107 $lb_f$ to about 110 $lb_f$, from about 110 $lb_f$ to about 130 $lb_f$, from about 110 $lb_f$ to about 125 $lb_f$, from about 110 $lb_f$ to about 120 $lb_f$, from about 110 $lb_f$ to about 115 $lb_f$, from about 110 $lb_f$ to about 112 $lb_f$, from about 112 $lb_f$ to about 130 $lb_f$, from about 112 $lb_f$ to about 125 $lb_f$, from about 112 $lb_f$ to about 120 $lb_f$, or from about 112 $lb_f$ to about 115 $lb_f$.

Advantageously, in various embodiments at various board densities as described herein, the dry composite gypsum board can have a compressive strength of at least about 170 psi (1,170 kPa), e.g., from about 170 psi to about 1,000 psi (6,900 kPa), from about 170 psi to about 900 psi (6,200 kPa), from about 170 psi to about 800 psi (5,500 kPa), from about 170 psi to about 700 psi (4,800 kPa), from about 170 psi to about 600 psi (4,100 kPa), from about 170 psi to about 500 psi (3,450 kPa), from about 170 psi to about 450 psi (3,100 kPa), from about 170 psi to about 400 psi (2,760 kPa), from about 170 psi to about 350 psi (2,410 kPa), from about 170 psi to about 300 psi (2,070 kPa), or from about 170 psi to about 250 psi (1,720 kPa). In some embodiments, the board has a compressive strength of at least about 450 psi (3,100 kPa), at least about 500 psi (3,450 kPa), at least about 550 psi (3,800 kPa), at least about 600 psi (4,100 kPa), at least about 650 psi (4,500 kPa), at least about 700 psi (4,800 kPa), at least about 750 psi (5,200 kPa), at least about 800 psi (5,500 kPa), at least about 850 psi (5,850 kPa), at least about 900 psi (6,200 kPa), at least about 950 psi (6,550 kPa), or at least about 1,000 psi (6,900 kPa). In addition, in some embodiments, the compressive strength can be bound by any two of the foregoing points. For example, the compressive strength can be between about 450 psi and about 1,000 psi (e.g., between about 500 psi and about 900 psi, between about 600 psi and about 800 psi, etc.). The compressive strength as used herein is measured using a materials testing system commercially available as ATS machine model 1610, from Applied Test Systems in Butler, Pa. The load is applied continuously and without a shock at speed of 1 inch/min.

Gypsum board according to embodiments of the invention can be made on typical gypsum wallboard manufacturing lines. For example, board manufacturing techniques are described in, for example, U.S. Pat. No. 7,364,676, U.S. Patent Application Publication 2010/0247937, and U.S. patent application Ser. No. 16/581,070. Briefly, the process typically involves discharging a cover sheet onto a moving conveyor. Since gypsum board is normally formed "face down," this cover sheet is the "face" cover sheet in such embodiments. Face and/or back skim coats as known in the art can be included as desired.

In some embodiments, one or both skim coat layers has an average dry core hardness that is at least about 1.5 times greater than the average dry core hardness of the board core, wherein the average core hardness is measured according to ASTM C-473-07, e.g., at least about 2 times greater, 2.5 times greater, 3 times greater, 3.5 times greater, 4 times greater, 4.5 times greater, etc., wherein each of these ranges can have any mathematically appropriate upper limit, such as, for example, 8, 7, 6, 5, 4, 3, or 2.

The slurries for forming the board core and for forming the skim coat layer can be formed in any suitable manner. For example, one mixer can be used to develop both slurry streams. The mixer can be e.g., in the form of "pin mixers" or "pin-less mixers" as desired where the raw materials are agitated. Alternatively, two or more separate mixers can be used. The multiple mixers can be in series or unconnected. Examples of mixers are described in European Patent 1637 302 B1, European Patent 2 929 996 B1, European Patent Application 3 342 571 A1, and U.S. Patent Application 2017/0008192 A1. If desired for efficiency, the mixer used for the skim coat layer(s) can have a smaller mixing volume capacity in some embodiments since the amount of slurry needed to be applied for the skim coat layer is less than the amount of slurry that is applied to form the board core. The "main" mixer (i.e., for forming the board core slurry) comprises a main body and a discharge conduit (e.g., a gate-canister-boot arrangement as known in the art or a modified outlet design (MOD) arrangement as described in U.S. Pat. Nos. 6,494,609 and 6,874,930). Foaming agent can be added in the discharge conduit of the mixer (e.g., in the gate as described, for example, in U.S. Pat. Nos. 5,683,635 and 6,494,609).

In some embodiments, it will be understood that the discharge conduit can include a slurry distributor with either a single feed inlet or multiple feed inlets, such as those described in U.S. Patent Application Publication 2012/0168527 A1 (application Ser. No. 13/341,016) and U.S. Patent Application Publication 2012/0170403 A1 (application Ser. No. 13/341,209), for example. In those embodiments, using a slurry distributor with multiple feed inlets, the discharge conduit can include a suitable flow splitter, such as those described in U.S. Patent Application Publication 2012/0170403 A1.

Board is formed in a sandwich structure, normally concurrently and continuously, as will be understood in the art. The face cover sheet travels as a continuous ribbon on a moving conveyor. After being discharged from its mixer, a skim coat layer slurry is applied to the moving face cover sheet. Also, hard edges, as known in the art, can be formed, e.g., from the same slurry stream forming the skim coat layer (e.g., the back skim coat layer) for convenience, if desired.

The board core slurry is then applied over the skim coat layer and covered with a second cover sheet (typically the "back" cover sheet) to form a wet assembly in the form of a sandwich structure that is a board precursor to the final product. The back (bottom) cover sheet bears a second skim coat layer, which contains the inventive starch as described herein to enhance bonding between the back paper and the board core. The second skim coat layer can be formed from the same or different gypsum slurry as for the first skim coat layer. In some embodiments, the skim coat layer is applied on the back side of the board, i.e., in bonding relation to the bottom cover sheet but no skim coat layer is applied between the core and the top cover sheet.

In some embodiments, the face paper (which is face down at the wet end of the board machine) can be made to be slightly wider than the width of the final board product since the edges of the paper can be folded up and over the edges of the board to meet the back paper (face up at the wet end of the board machine) to form a board envelope. For example, for nominal 48 inch wide board, the face paper can have a width of about 50 inches or more (e.g., from about 50 to about 52 inches, such as about 50.375 inches). Correspondingly, in some embodiments, the back paper can be made to be narrower than the width of the board. Thus, for nominal 48 inch wide board, the back paper can have a width of less than about 48 inches (e.g., from about 46.5 inches to about 47.5 inches, such as about 47.125 inches).

The wet assembly thereby provided is conveyed to a forming station where the product is sized to a desired thickness (e.g., via forming plate), and to one or more knife sections where it is cut to a desired length. The wet assembly is allowed to harden to form the interlocking crystalline matrix of set gypsum, and excess water is removed using a drying process (e.g., by transporting the assembly through a kiln).

It also is common in the manufacture of gypsum board to use vibration in order to eliminate large voids or air pockets from the deposited slurry. Each of the above steps, as well as processes and equipment for performing such steps, are known in the art.

The invention is further illustrated by the following exemplary embodiments. However, the invention is not limited by the following embodiments.

(1) Gypsum board, slurry, method of making acid-modified flour, or method of making gypsum board as described herein.

(2) A method of making acid-modified flour comprising: combining starting flour and a strong acid that substantially avoids chelating calcium ions to form a mixture; heating the mixture; and adding a neutralizer to the heated mixture to achieve a pH of from about 4.0 to about 7.5 to form the acid modified flour.

(3) The method of embodiment 2, further comprising drying the mixture.

(4) The method of embodiment 3, wherein the drying is at a temperature of at least about 25° C. (e.g., from about 25° C. to about 50° C.), for example, in an oven.

(5) The method of any one of embodiments 2-4, further comprising removing agglomerates of the acid-modified flour, the agglomerates having an average diameter of at least about 300 µm (e.g., from about 300 µm to about 1000 µm), wherein the agglomerates are removed before or after drying.

(6) The method of embodiment 5, wherein the agglomerates are removed by screening (e.g., by passing the mixture through a sieve (e.g., a No. 50 sieve).

(7) The method of any one of embodiments 2-6, wherein the acid-modified flour has a lower water demand when used in a stucco slurry than a similar stucco slurry varying only by including pregelatinized starch instead of the acid-modified flour.

(8) The method of any one of embodiments 2-7, wherein the mixture is substantially free of water.

(9) The method of any of embodiments 2-8, wherein the starting flour contains at least about 70% starch by weight.

(10) The method of any of embodiments 2-9, wherein the starting flour contains at least about 80% starch by weight.

(11) The method of any one of embodiments 2-10, wherein the starting flour contains corn flour, sorghum, rice flour, or any combination thereof.

(12) The method of any one of embodiments 2-11, wherein the starting flour contains corn flour, sorghum, or any combination thereof.

(13) The method of any one of embodiments 2-12, wherein the starting flour contains corn flour.

(14) The method of any one of embodiments 2-13, wherein the starting flour contains sorghum.

(15) The method of any one of embodiments 2-14, wherein the starting flour contains rice flour.

(16) The method of any one of embodiments 2-15, wherein the strong acid has a pKa of less than 0.

(17) The method of any one of embodiments 2-16, wherein the strong acid has a pKa of from about 0 to about −10.

(18) The method of any one of embodiments 2-17, wherein the strong acid is sulfuric acid, nitric acid, hydrochloric acid, or any combination thereof.

(19) The method of embodiment 18, wherein the acid is sulfuric acid.

(20) The method of any one of embodiments 2-19, wherein the neutralizer is sodium carbonate, sodium hydroxide or any combination thereof.

(21) The method of embodiment 20, wherein the neutralizer is sodium carbonate.

(22) The method of any one of embodiments 2-21, wherein the heating is at a temperature of from about 50° C. to about 100° C. (e.g., from about 70° C. to about 90° C.).

(23) The method of any one of embodiments 2-22, wherein the heating is sufficient to achieve a hot water viscosity of from about 50 Brabender Units (BU) to about 420 BU, as measured according to the HWVA test.

(24) The method of any one of embodiments 2-23, wherein the heating is from about 90 minutes to about 150 minutes (e.g., from about 105 minutes to about 135 minutes).

(25) The method of any one of embodiments 2-24, wherein at least about 80% of the starting flour particles pass through a 50 mesh sieve.

(26) The method of any one of embodiments 2-25, wherein at least about 90% of the starting flour particles pass through a 50 mesh sieve.

(27) The method of any one of embodiments 2-26, wherein at least about 95% of the starting flour particles pass through a 50 mesh sieve.

(28) The method of any one of embodiments 2-27, wherein at least about 70% of the acid-modified flour particles pass through a 50 mesh sieve.

(29) The method of any one of embodiments 2-28, wherein at least about 80% of the acid-modified flour particles pass through a 50 mesh sieve.

(30) The method of any one of embodiments 2-29, wherein at least about 90% of the acid-modified flour particles pass through a 50 mesh sieve.

(31) The method of any one of embodiments 2-30, wherein the acid-modified flour has a hot water viscosity of from about 50 BU to about 420 BU, as measured according to the HWVA test.

(32) A method of making acid-modified flour comprising: (a) combining corn flour and a sulfuric acid to form a mixture; (b) heating the mixture at a temperature of from about 50° C. to about 100° C.; (c) adding sodium carbonate to the heated mixture to achieve a pH of from about 4.0 to about 7.5 to form the acid modified flour, (d) filtering large agglomerates using a No. 50 mesh sieve; and (e) drying the acid-modified flour, the acid-modified flour having a hot water viscosity of from about 50 BU to about 420 BU, as measured according to the HWVA test.

(33) An acid-modified flour prepared according to any one of embodiments 2-32.

(34) A board comprising a set gypsum core disposed between two cover sheets, the core formed from a slurry comprising stucco, water and an acid-modified flour having a hot water viscosity of from about 50 BU to about 420 BU, as measured according to the HWVA test.

(35) The board of embodiment 34, wherein the board has a nail pull resistance of at least 70, according to ASTM 473-10, Method B.

(36) A method of making board comprising: (a) forming an acid-modified flour by (i) combining starting flour and a strong acid that substantially avoids chelating calcium ions to form a mixture, (ii) heating the mixture, and (iii) adding a neutralizer to the heated mixture to achieve a pH of from about 4.0 to about 7.5 to form the acid modified flour; (b) adding or mixing the acid-modified flour with at least water and stucco to form a slurry; (c) disposing the slurry to form a board core between a first cover sheet and a second cover sheet to form a wet assembly; (d) cutting the wet assembly into a board; and (e) drying the board.

(37) The method of embodiment 36, further comprising (f) drying the mixture.

(38) The method of embodiment 37, wherein the drying is at a temperature of at least about 25° C. (e.g., from about 25° C. to about 50° C.), for example, in an oven.

(39) The method of any one of embodiments 35-38, further comprising removing agglomerates from the acid-modified flour, the agglomerates having a diameter of at least about 300 µm (e.g., from about 300 µm to about 1000 µm), wherein the agglomerates are removed before or after drying.

(40) The method of embodiment 39, wherein the agglomerates are removed by filtration (e.g., by passing the mixture through a sieve (e.g., a No. 50 mesh sieve)).

(41) The method of any one of embodiments 35-40, wherein the mixture has less than about 30% moisture.

(42) The method of any of embodiments 35-41, wherein the starting flour contains at least about 70% starch by weight.

(43) The method of any of embodiments 35-42, wherein the starting flour contains at least about 80% starch by weight.

(44) The method of any one of embodiments 35-43, wherein the starting flour contains corn flour, sorghum, rice flour, or any combination thereof.

(45) The method of any one of embodiments 35-44, wherein the starting flour contains corn flour, sorghum, or any combination thereof.

(46) The method of any one of embodiments 35-45, wherein the starting flour contains corn flour.

(47) The method of any one of embodiments 35-46, wherein the starting flour contains sorghum.

(48) The method of any one of embodiments 35-47, wherein the starting flour contains rice flour.

(49) The method of any one of embodiments 35-48, wherein the strong acid has a pKa less than 0.

(50) The method of any one of embodiments 35-49, wherein the strong acid has a pKa of from about 0 to about −10.

(51) The method of any one of embodiments 35-50, wherein the strong acid is sulfuric acid, nitric acid, hydrochloric acid, or any combination thereof.

(52) The method of embodiment 51, wherein the acid is sulfuric acid.

(53) The method of any one of embodiments 35-52, wherein the neutralizer is sodium carbonate, sodium hydroxide, or any combination thereof.

(54) The method of embodiment 53, wherein the neutralizer is sodium carbonate.

(55) The method of any one of embodiments 35-54, wherein the heating is at a temperature of from about 50° C. to about 100° C. (e.g., from about 70° C. to about 90° C.).

(56) The method of any one of embodiments 35-55, wherein the heating is sufficient to achieve a hot water viscosity of from about 50 Brabender Units (BU) to about 420 BU, as measured according to the HWVA test.

(57) The method of any one of embodiments 35-56, wherein the heating is from about 90 minutes to about 150 minutes (e.g., from about 105 minutes to about 135 minutes).

(58) The method of any one of embodiments 35-57, wherein at least about 80% of the starting flour particles pass through a 50 mesh sieve.

(59) The method of any one of embodiments 35-58, wherein at least about 90% of the starting flour particles pass through a 50 mesh sieve.

(60) The method of any one of embodiments 35-59, wherein at least about 95% of the starting flour particles pass through a 50 mesh sieve.

(61) The method of any one of embodiments 35-60, wherein at least about 60% of the acid-modified flour particles pass through a No. 50 mesh sieve.

(62) The method of any one of embodiments 35-61, wherein at least about 70% of the acid-modified flour particles pass through a 50 mesh sieve.

(63) The method of any one of embodiments 35-62, wherein at least about 80% of the acid-modified flour particles pass through a 50 mesh sieve.

(64) The method of any one of embodiments 35-63, wherein the acid-modified flour has a hot water viscosity of from about 50 BU to about 420 BU, as measured according to the HWVA test.

(65) The method of any one of embodiments 35-64, wherein the acid-modified flour requires a lower water demand in the stucco slurry as compared with a similar stucco slurry varying only by including pregelatinized starch instead of the acid-modified flour.

(66) The method of any one of embodiments 35-65, wherein the acid-modified flour enhances the strength in the board core in the dry board as compared with a dry board having a board core formed from a similar stucco slurry varying only by excluding the acid-modified flour.

(67) The method of any one of embodiments 35-66, wherein the board has a nail pull resistance of at least about 70, according to ASTM 473-10, Method B.

(68) A method of making board comprising: (a) forming an acid-modified flour by (i) combining starting con flour and a sulfuric acid to form a mixture, (ii) heating the mixture at a temperature of from about 50° C. to about 100° C., (iii) adding sodium carbonate to the heated mixture to achieve a pH of from about 4.0 to about 7.5 to form the acid modified flour, (iv) filtering large agglomerates having a size of at least about 300 μm, and (v) drying the acid-modified flour, the acid-modified flour having a hot water viscosity of from about 50 BU to about 420 BU, as measured according to the HWVA test; (b) adding or mixing the acid-modified flour with at least water and stucco to form a slurry; (c) disposing the slurry to form a board core between a first cover sheet and a second cover sheet to form a wet assembly; (d) cutting the wet assembly into a board; and (e) drying the board.

(69) The mixture according to embodiment 68, wherein the mixture contains from about 97 wt. % to about 99.5 wt. % of the flour, and from about 0.5 wt. % to about 3 wt. % of the acid, wherein the weight percentages are in relation to the total weight of the mixture.

(70) A board made according to any one of embodiments 35-69.

(71) A slurry comprising water, stucco, and at least one acid-modified flour having a hot water viscosity of from about 50 BU to about 420 BU, as measured according to the HWVA test.

(72) Product made from the slurry of embodiment 71.

It shall be noted that the preceding are merely examples of embodiments. Other exemplary embodiments are apparent from the entirety of the description herein. It will also be understood by one of ordinary skill in the art that each of these embodiments may be used in various combinations with the other embodiments provided herein.

The following examples further illustrate the invention but, of course, should not be construed as in any way limiting its scope.

Example 1

This example demonstrates a process of semi-dry modification of corn flour using acid.

In particular, four samples of corn flour were prepared. Sulfuric acid solution (IM) was sprayed on corn flour (150 g) in a mixing bowl of a Hobart mixer (model N50) while the mixer was operating at speed 2 for a total of 10 minutes. The samples differed in the amount of the sulfuric acid added to the corn flour. The amount of sulfuric acid in the four samples was 15 g, 17 g, 18 g, and 19 g, respectively.

In the preparation of each modified flour, the mixture of flour and acid was sealed in a glass jar. The jar was left at room temperature for two hours. Then, the jar was heated at 80° C. for two more hours. The Hobart mixer was cleaned and the acid-treated flour was inserted into the mixing bowl. Sodium carbonate (IM) was sprayed on the flour while the mixer was operating at speed 2 for a total often minutes. Lumps were removed using a No. 50 sieve. The starch was dried at 38° C. overnight. The pH of the final starch was between 5-7.

Example 2

This example demonstrates measurement of hot water viscosity to illustrate degree of acid hydrolysis of different corn flour samples which varied in the amount of acid added for modification of starch within the corn flour.

In particular, four different samples of corn flour were prepared and tested for hot water viscosity. Each corn flour sample was acid-modified with sulfuric acid, with each sample given a different amount of the sulfuric acid (i.e., 0.98%, 1.11%, 1.18%, and 1.24%, respectively). The degree of acid hydrolysis of the corn flour was examined using a Brabener Amylograph. In particular, flour (60 g, dry matter) was added into water until reaching a total weight of 400 g. The slurry was transferred into a measuring cup of a Brabender Viscometer-E. Testing was carried out using the following temperature profile. Each sample had a starting temperature of 25° C. The slurry was heated to 92° C. at a rate of 5° C./min. The slurry was held at 92° C. for ten minutes. The slurry was then cooled to 55° C. at a rate of 5° C./minute. The slurry was held at 55° C. for another ten minutes. The viscosity (BU) at the end of 92° C. incubation was recorded as the Hot Water Viscosity.

The amylogram is depicted in FIG. 1. Native corn flour had a hot water viscosity of 1200 BU. The respective hot water viscosities of corn flour treated with 0.98%, 1.11%, 1.18%, and 1.24% of sulfuric acid were 417 BU, 213 BU, 77 BU, and 59 BU, respectively. These values indicate that the molecular weight of the starch was reduced by acid hydrolysis. The starch within the flour were hydrolyzed to a higher degree, as the amount of acid increased.

Example 3

This example demonstrates the formation and strength of laboratory gypsum panels prepared from stucco slurries containing acid modified corn flour.

Six laboratory gypsum panels (12 inch×12 inch×0.5 inch) were made according to the formulation listed in Table 1. The difference between the panels was the type of flour used in making the gypsum panel, as identified in Table 2. Air was inserted using a foam generator. Manila paper (47 lb/msf) was used as face paper and Newsline paper (34 lb/msf) was used as back paper. In Table 1, the dispersant is Diloflo (GEO Specialty Chemicals). The retarder is Versenex 80 (Dow, Inc.).

TABLE 1

Formulation of stucco slurry for preparing laboratory gypsum panel sample

| Ingredient | Weight (g) |
| --- | --- |
| Stucco | 500 |
| Heat Resistant Accelerator | 5 |
| Flour | 10 |
| Sodium trimetaphosphate solution 10% (w/w) | 10 |
| Dispersant | 2.5 |
| Retarder solution 1% (w/w) | 13 |
| Gauging water | 388 |

Each set panel was heated at 232° C. for ten minutes. Each set panel was then heated at 190° C. for 15 minutes. The samples were made using the same formulation and the same amount of foam. Even though there was weight variation between samples, they were considered approximately the same. The nail pull strength of the laboratory gypsum panel samples are shown in Table 2.

TABLE 2

Nail pull strength of laboratory gypsum panel samples containing flour

| Panel | Type of flour used in making the gypsum panel | Nail pull (lb) |
| --- | --- | --- |
| 2A | Corn flour modified with 0.98% sulfuric acid | 76.3 |
| 2B | Corn flour modified with 1.11% sulfuric acid | 77.1 |
| 2C | Corn flour modified with 1.18% sulfuric acid | 75.8 |
| 2D | Corn flour modified with 1.24% sulfuric acid | 78.5 |
| 2E | Native corn flour without acid modification | 64.2 |
| 2F | Pregelatinized partially hydrolyzed corn flour | 73.4 |

Panels with acid modified flour had similar nail pull strength as that with a pregelatinized, partially hydrolyzed corn flour, and had higher nail pull strength than that with native corn flour.

Example 4

This example demonstrates the hydration rate and fluidity (slump size) of stucco slurries containing flour.

A formulation of stucco slurry containing flour is set forth in Table 3, which was used to evaluate its hydration rate and fluidity.

TABLE 3

Formulation of stucco slurry

| Ingredient | Weight (g) |
| --- | --- |
| Stucco | 200 |
| Heat resistant accelerator | 2 |
| Starch | 4 |
| Dispersant | 0.5 |
| Water | 220 |

Two slurry samples were prepared, the difference being the type of flour used in the slurry, as identified in Table 4. The hydration rate of the stucco slurry containing different starches was measured using Temperature Rise Set (TRS) testing as known in the art. Time to 50% hydration was used to compare the hydration rate. The slump size of stucco slurry containing different starches was used to measure its fluidity.

TABLE 4

Hydration rate and slump size

| Slurry | Type of flour used in making gypsum panel | Time to 50% hydration (min) | Slump (inches) |
| --- | --- | --- | --- |
| 4A | Acid-modified corn flour | 3.42 | 12 |
| 4B | Pregelatinized partially hydrolyzed corn flour | 3.42 | 9½ |

Table 4 shows that the acid modified starch had a similar hydration rate as the pregelatinized, partially hydrolyzed corn flour and a better fluidity (larger lump) than the pregelatinized, partially hydrolyzed corn flour.

Example 5

Two laboratory gypsum panels (12 inch×12 inch×0.5 inch) were made according to the formulation listed in Table 1 except that sodium trimetaphosphate was removed from the formulation. This modified formulation is listed below in Table 5. Air was inserted using a foam generator. Manila paper (47 lb/msf) was used as face paper and Newsline paper (34 lb/msf) was used as back paper. The dispersant is Diloflo (GEO Specialty Chemicals), and the retarder is Versenex 80 (Dow, Inc.).

TABLE 5

Formulation of stucco slurry for preparing laboratory gypsum panel samples without STMP

| Ingredient | Weight (g) |
| --- | --- |
| Stucco | 500 |
| Heat Resistant Accelerator | 5 |
| Flour | 10 |
| Dispersant | 2.5 |
| Retarder solution 1% (w/w) | 13 |
| Gauging water | 388 |

Each set panel was heated at 232° C. for ten minutes. Each set panel was then heated at 190° C. for 15 minutes. Even though there was weight variation between gypsum board samples with this modified formulation and the samples of the formulation in Table 1, they were considered comparable and approximately the same. The nail pull and compressive strengths of the laboratory gypsum panel samples with the modified formulation are shown in Table 6 below.

TABLE 6

Nail pull and compressive strengths of gypsum panel samples without STMP

| Panel | Type of flour used in making the gypsum panel | Nail pull (lb) | Compressive strength (psi) |
| --- | --- | --- | --- |
| 3A | Corn flour modified with 1.18% sulfuric acid | 81.3 | 455 |
| 3B | Native corn flour without acid modification | 65.3 | 361 |

This Example 5 demonstrates that panels with acid modified flour had higher nail pull strength and compressive strength than those with native corn flour even when no sodium trimetaphosphate was used.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of making gypsum board comprising:
   (a) forming an acid-modified flour by (i) combining starting flour from a dry milling process and a strong acid that substantially avoids chelating calcium ions to form a mixture, (ii) heating the mixture at a temperature of from about 50° C. to about 100° C., (iii) adding a neutralizer to the mixture to achieve a pH of from about 4.0 to about 7.5, and (iv) drying the mixture, the acid-modified flour having a hot water viscosity of from about 50 BU to about 420 BU, as measured according to the HWVA test;
   (b) adding the acid-modified flour to at least water and stucco to form a slurry;
   (c) disposing the slurry to form a gypsum board core between a first cover sheet and a second cover sheet to form a wet assembly;
   (d) cutting the wet assembly into the gypsum board; and
   (e) drying the gypsum board.

2. The method of claim 1, wherein the mixture is dried after the neutralizer is added.

3. The method of claim 2, further comprising removing agglomerates from the mixture, the agglomerates having a diameter of at least about 300 μm, wherein the agglomerates are removed before drying the mixture.

4. The method of claim 3, wherein the gypsum board has a nail pull resistance of at least about 70 pounds-force according to ASTM 473-10, Method B and the gypsum board has a core hardness of at least 11 pounds.

5. The method of claim 2, further comprising removing agglomerates from the mixture, the agglomerates having a diameter of at least about 300 μm, wherein the agglomerates are removed after drying the mixture.

6. The method of claim 2, wherein the gypsum board has a nail pull resistance of at least about 70 pounds-force according to ASTM 473-10, Method B and the gypsum board has a core hardness of at least 11 pounds.

7. The method of claim 1, wherein the gypsum board has a nail pull resistance of at least about 70 pounds-force according to ASTM 473-10, Method B and the gypsum board has a core hardness of at least 11 pounds.

8. The method of making board of claim 1, wherein the mixture contains from about 97 wt. % to about 99.5 wt. % of the flour, and from about 0.5 wt. % to about 3 wt. % of the acid, wherein the weight percentages are in relation to the total weight of the mixture.

9. The method of claim 1, wherein the starting flour is corn flour.

10. The method of claim 1, wherein the neutralizer is sodium carbonate.

11. The method of claim 1, further comprising removing agglomerates from the mixture, the agglomerates having a diameter of from about 300 μm to about 1000 μm, wherein the agglomerates are removed before drying the mixture.

12. The method of claim 1, further comprising removing agglomerates from the mixture, the agglomerates having a diameter of from about 300 μm to about 1000 μm, wherein the agglomerates are removed after drying the mixture.

13. The method of claim 1, further comprising removing agglomerates from the mixture, the agglomerates having a diameter of from about 300 μm to about 1000 μm, wherein:
   the agglomerates are removed before or after drying the mixture, and
   the gypsum board has a nail pull resistance of at least about 70 pounds-force according to ASTM 473-10, Method B and the gypsum board has a core hardness of at least 11 pounds.

14. A method of making board comprising:
   (a) forming an acid-modified flour by (i) combining starting corn flour obtained from a dry milling process and a sulfuric acid to form a mixture, (ii) heating the mixture at a temperature of from about 50° C. to about 100° C., (iii) adding sodium carbonate to the mixture to achieve a pH of from about 4.0 to about 7.5 to form the acid-modified flour, (iv) filtering large agglomerates having a size of at least about 300 μm, and (v) drying the mixture, the acid-modified flour having a hot water viscosity of from about 50 BU to about 420 BU, as measured according to the HWVA test;
   (b) adding the acid-modified flour to at least water and stucco to form a slurry;
   (c) disposing the slurry to form a board core between a first cover sheet and a second cover sheet to form a wet assembly;
   (d) cutting the wet assembly into a board; and
   (e) drying the board.

15. The method of making board of claim 14, wherein the mixture contains from about 97 wt. % to about 99.5 wt. % of the flour, and from about 0.5 wt. % to about 3 wt. % of the acid, wherein the weight percentages are in relation to the total weight of the mixture.

16. The method of claim 15, wherein the gypsum board has a nail pull resistance of at least about 70 pounds-force according to ASTM 473-10, Method B and the gypsum board has a core hardness of at least 11 pounds.

17. The method of claim 14, wherein
   the mixture is dried after the neutralizer is added, and
   the gypsum board has a nail pull resistance of at least about 70 pounds-force according to ASTM 473-10, Method B and the gypsum board has a core hardness of at least 11 pounds.

* * * * *